United States Patent
Sherwood

(10) Patent No.: US 7,346,505 B1
(45) Date of Patent: Mar. 18, 2008

(54) SYSTEM AND METHOD FOR VOICEMAIL TRANSCRIPTION

(75) Inventor: Amy L. Sherwood, Marietta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 716 days.

(21) Appl. No.: 09/964,395

(22) Filed: Sep. 28, 2001

(51) Int. Cl.
G10L 15/26 (2006.01)
H04M 11/00 (2006.01)

(52) U.S. Cl. ............... 704/235; 704/270; 379/100.08; 379/93.24

(58) Field of Classification Search ............ 704/235, 704/270
See application file for complete search history.

(56) References Cited

U.S. PATENT DOCUMENTS

| | | | |
|---|---|---|---|
| 6,035,104 A * | 3/2000 | Zahariev | 709/203 |
| 6,219,638 B1 * | 4/2001 | Padmanabhan et al. | 704/235 |
| 6,430,177 B1 * | 8/2002 | Luzeski et al. | 370/356 |
| 6,430,405 B1 * | 8/2002 | Jambhekar et al. | 455/403 |
| 6,535,848 B1 * | 3/2003 | Ortega et al. | 704/235 |
| 6,651,042 B1 * | 11/2003 | Field et al. | 704/270 |
| 6,775,651 B1 * | 8/2004 | Lewis et al. | 704/235 |
| 6,850,609 B1 * | 2/2005 | Schrage | 379/202.01 |
| 7,075,671 B1 * | 7/2006 | Kanevsky et al. | 358/1.15 |
| 7,103,154 B1 * | 9/2006 | Cannon et al. | 379/67.1 |
| 2002/0065042 A1 * | 5/2002 | Picoult et al. | 455/41 |
| 2002/0097262 A1 * | 7/2002 | Iwase et al. | 345/744 |
| 2002/0169605 A1 * | 11/2002 | Damiba et al. | 704/235 |
| 2003/0128820 A1 * | 7/2003 | Hirschberg et al. | 379/88.14 |
| 2004/0005040 A1 * | 1/2004 | Owens et al. | 379/93.24 |

* cited by examiner

Primary Examiner—David Hudspeth
Assistant Examiner—Matthew J Sked
(74) Attorney, Agent, or Firm—Withers & Keys LLC

(57) ABSTRACT

A system and method is described for transcribing a recorded message automatically from a voicemail message system or an answering machine. The designated message may be automatically transcribed and forwarded to various archival devices, such as a printer, a facsimile machine, computer memory storage, or email. Thus, the system and method of the present invention automates the transcription process of a recorded message eliminating the need for a person to transcribe the message.

41 Claims, 3 Drawing Sheets

KNOWN ART

SYSTEM AND METHOD FOR VOICEMAIL TRANSCRIPTION

BACKGROUND

1. Field of the Invention

The present invention relates generally to voice-recognition software applications. More specifically, the present invention is directed to a system and method for voicemail transcription.

2. Background of the Invention

Leaving voice messages on voicemail mailboxes or on telephone answering machines have become commonplace. In the business world, it is not uncommon for a person to receive long and detailed voicemail or answering machine messages. Such long messages may have important information or detailed descriptions that are necessary to document in written form.

However, a conventional way to document such long messages is by having a person listen to and transcribe the message onto a word processing software package. This process may be time-consuming for a businessperson who must await the transcription of the message before, for example, replying to the voicemail message. Also, this conventional process is taxing on transcriptionists, such as secretaries and other staff, who typically must listen to lengthy and detailed messages and transcribe them, in a relatively short period of time, for a person that is awaiting the transcription. The transcriptionist may have other work that needs to be completed, but may have to stop the other work to first transcribe the message for the person awaiting the transcription.

If a person tends to get many lengthy voicemail messages, her secretary will understandably dread the constant duty of transcribing all of these messages. Such dislike for a task may lead to errors in transcription or omission of certain segments of the message.

Alternatively, one may listen to the voicemail message numerous times and take notes on the most important aspects of the message for information or future reference. However, this method necessarily leaves out much information and may inadvertently leave out some of the most important information of a recorded message. Furthermore, it may be necessary to hear a message several times before noting down all the important aspects of the message. Repeatedly listening to the same voicemail message is time-consuming and an inefficient use of time. However, conventional voicemail and answering machines do not provide any other alternatives than to either take notes while listening to a message, or having someone transcribe the message, which is both time-consuming and economically unfeasible.

A system and method, typically used in conventional voicemail systems, are depicted in FIG. 1. Although the method shown in FIG. 1 presents a series of steps in a particular order, the order of such steps may be changed without affecting the overall function or limitations of such a conventional method. For example, instead of deciding what to do with a recorded message at step 103 after hearing the message at step 102, the message may be saved, deleted, or forwarded before the message has finished playing rather than after the complete playback of the message.

As shown in FIG. 1, a user at step 101 accesses a conventional voicemail system by dialing a voicemail phone number. The voicemail system typically informs the user that there are new messages on the voicemail system. The user then listens to the messages at step 102. The messages may be either new messages that have not been previously heard by the user, old messages that have already been heard by the user, or saved messages that have been saved into a storage area for a pre-designated period of time typically set by the system.

After hearing a particular message, the user then considers several options, as shown in step 103, on how to handle each message. The user may save the message, as shown in step 104, wherein the message is saved in a memory storage area of the voicemail system. Typically, the message is saved for a predetermined period of time, such as, for example, two weeks, after which time the message is automatically deleted by the system. When the message is saved, the user may retrieve and re-hear the message multiple times. Typically, the user must save and/or replay an important message multiple times to be able to extract important information from the message. This conventional process is inefficient and time-consuming.

After hearing a message, the user could delete the message, as shown in step 105. Deleting the message permanently removes the message from the message system. Thus, once a message is deleted, there typically is no way of retrieving the message. A message is only deleted when a user has understood its information and no further information is needed from the message. However, sometimes there is information on messages that are deleted that would be important to document or record for future use or reference. However, once a message is deleted, such documentation or recording typically is impossible.

Alternatively, a user may choose to instantly forward a recorded message to one or more designated recipients, as shown at step 106. Typically, the user can add an additional introduction to the forwarded message so that the one or more recipients may hear an additional message from the user in addition to the forwarded message. Such an introduction may be, for example, instructions to a transcriptionist, such as a secretary, to transcribe the attached message. Furthermore, forwarding such messages to a transcriptionist is a typical way of getting the message transcribed. However, because of the limitations of having a third party transcribe a message, as discussed above, such a method typically is inefficient and time-consuming. Furthermore, if the user desires to have a message transcribed at an unusual hour that a transcriptionist is unavailable, such as, for example, a late hour in the evening, then the user would not be able to get such a transcription unless the user transcribes the message herself.

SUMMARY OF THE INVENTION

The present invention overcomes the drawbacks of conventional voicemail and answering machine systems by providing an option that may be activated at or during the playback of a recorded message to automatically transcribe the message. After transcription, the transcribed message then may be forwarded to an archival device or archival means, typically used for output or storage of a transcribed message and include, for example, a printer, a facsimile machine, an email address, an instant messenger account, a file on a personal computer, or the like. One or more recipients also may be designated to receive each transcribed message, as well as one or more archival devices.

In accordance with an exemplary embodiment of this invention, the present invention includes a system and method of selectively transcribing a recorded message and providing a copy of the transcribed message through an archival means.

In another exemplary embodiment of the present invention, the present invention includes a portable system and method of automatically transcribing voicemail messages.

It is therefore an object of the present invention to provide an automated transcribing system and method that enables a user to have a recorded message transcribed upon hearing the message.

It is still another object of the present invention to selectively deliver a transcribed message to one or more designated recipients.

It is a further object of this invention to selectively deliver a transcribed message to one or more archival means.

These and other objects of the present invention will become apparent upon a reading of the following detailed description in conjunction with the associated drawings.

It is to be understood that both the foregoing general description and the following detailed description are exemplary and explanatory only and are not restrictive of the invention, as claimed.

The advantages and purpose of the invention will be set forth in part in the description that follows, and in part will be obvious from the description, or may be learned by practice of the invention. The advantages and purpose of the invention will be realized and attained by means of the elements and combinations particularly pointed out in the appended claims.

DETAILED DESCRIPTION OF THE INVENTION

In view of drawbacks of conventional voicemail systems, the present invention provides an improved electronic recorded message transcription system and method that selectively transcribes a designated recorded message and delivers the transcribed message to one or more designated archival means.

Reference will now be made in detail to the present exemplary embodiments of the invention, examples of which are illustrated in the accompanying drawings. Wherever possible, the same reference numbers will be used throughout the drawings to refer to the same or like parts.

Figure 2:
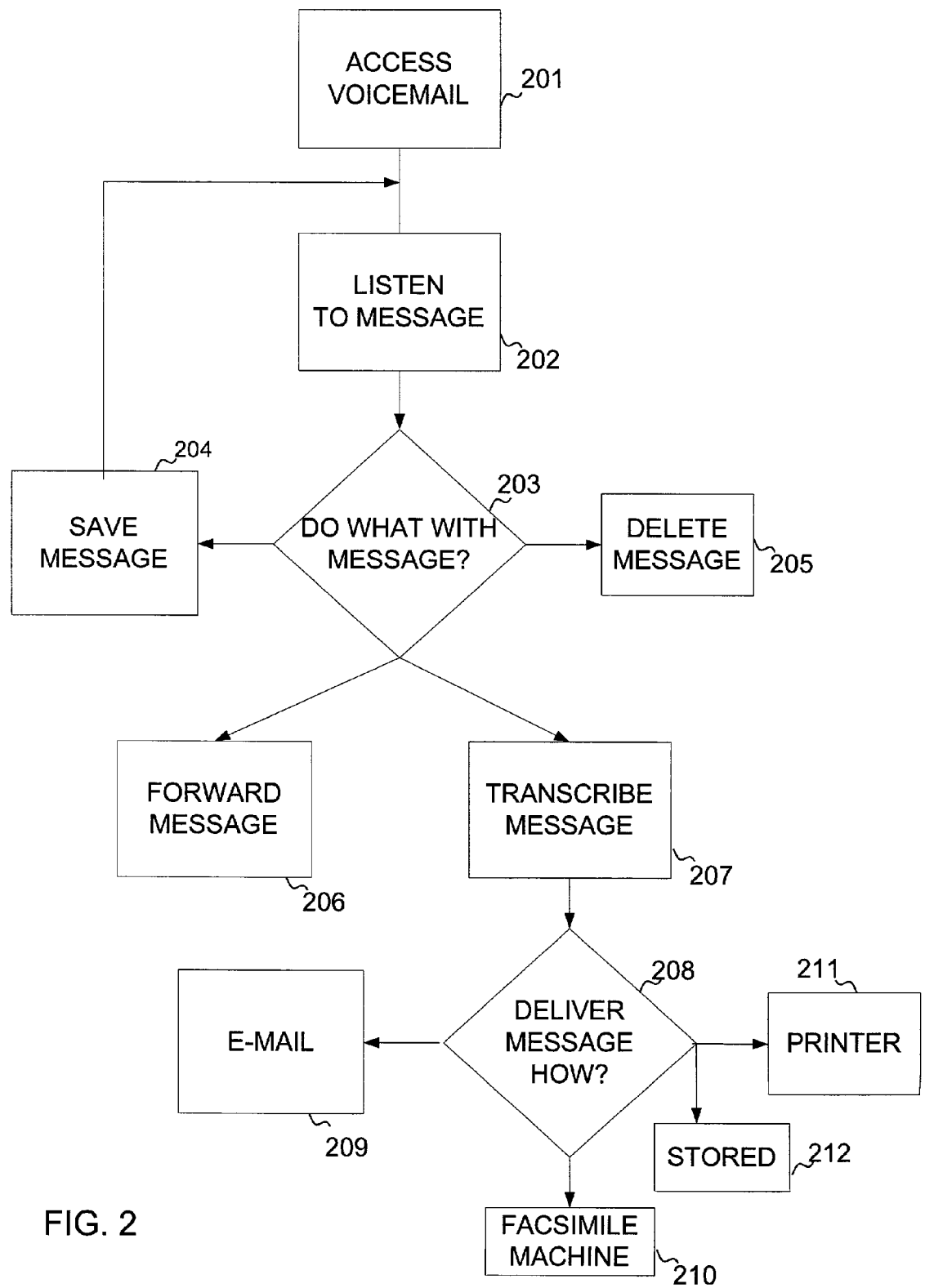
FIG. 2 illustrates an exemplary embodiment of a method according to the present invention wherein a recorded message may be transcribed and forwarded to one of several archival means.

An exemplary embodiment of a method of the present invention is illustrated in FIG. 2. An exemplary embodiment of a system of the present invention is one that can operate the method depicted in FIG. 2. Thus, throughout this disclosure, a system and a method of automatic transcription of recorded messages will be used interchangeably.

Although the exemplary embodiments described below are depicted in a particular sequential order, the order may be changed without departing from the teaching of the process, as long as the overall function and goals of the process are substantially satisfied. For example, in FIG. 2, a user listens to a recorded message at step 202 before deciding what to do with the recorded message at step 203. Alternatively, the user may initiate step 203 before the message is completely heard at step 202 if the user determines, even before hearing the complete message, that the message should be transcribed.

As depicted in FIG. 2, an exemplary embodiment of a method of the present invention requires that a user access a voicemail system at step 201 in order to hear messages received and recorded by the voicemail recording system. The voicemail system may either be a service provided through a phone company, or part of a stand-alone device which may be purchased and connected to a telephone line or answering machine at home or work to perform the below described process.

The user listens to a recorded message at step 202, as in a conventional voicemail system. After, or during, playback of a recorded message, the user may be prompted by the voicemail system to choose one of several options to act upon the message just heard. The user may save the message, as shown in step 204, whereupon the message is saved in the voicemail system's memory storage and is retrievable by the user for a predetermined amount of time. The user also may delete the message as shown in step 205. Once a message is deleted, the message typically cannot be retrieved. The user also may forward the message to one or more recipients, as shown in step 206. The user may add an additional introduction to the forwarded message, which may be, for example, instructions to the recipient of the forwarded message to transcribe the message. Thus, the method steps described in steps 201-206 of FIG. 2 substantially parallel those of the conventional voicemail method steps 101-106 shown in FIG. 1.

However, the exemplary embodiment of the method of the present invention shown in FIG. 2 has the additional and unique option of allowing the user to transcribe the recorded message, as shown in step 207. When a user chooses to follow step 207 in transcribing a recorded message, the system further inquires at step 208 about the user's desired method of delivery of the transcribed message, or in other words, the user's choice of archival means. Options that the user may choose at step 208 may include delivery of the message through email at step 209 to one or more designated email addresses. Alternatively, the transcribed message may be delivered to one or more facsimile machines at step 210. A further alternative is delivery of the transcribed message to one or more designated printers at step 211. Additionally, the transcribed message may be stored at step 212 in one or more file locations in a computer system.

The exemplary archival means used to store or output the transcribed message have all been pre-designated by the user at the time the transcription system is set up. For example, a user may fill out a form through her phone company labeling designated archival means as option #1, option #2, etc. Email addresses and facsimile numbers may easily be designated as archival means options. However, a printer may require a cable connection through a telephone line to be able to be accessed by the voicemail system. Thus, when a user is prompted by the transcription system at step 208 to enter one or more archival means for delivery of the transcribed message, the user merely has to enter numeric codes corresponding to the user's pre-designated labeling scheme for the archival means. Set up or changes to the option order and labeling of various archival means also may be made through a designated Internet site provided by a telephone company offering such a voicemail transcription service.

Alternatively, if the system is not provided by a telephone company and, rather, is part of a stand-alone device, then the device could have a telephone line to connect it to the various designated archival means. Alternatively the stand-alone device also could have external ports that are capable of connecting with various electrical connectors leading to the designated archival means. In either case, the stand-alone device should have input means, such as an input display or buttons with symbols of various archival means, to be able to input designated archival means that a user would want to use.

More than one type of archival means, which may be, for example, an email, a facsimile machine, printer, a storage file on a personal computer, or the like, may be chosen to store or display the transcribed message. Thus, more than one person may be designated as a recipient of the transcribed message. This would be beneficial when a given transcribed message should be forwarded to multiple individuals.

Figure 3:
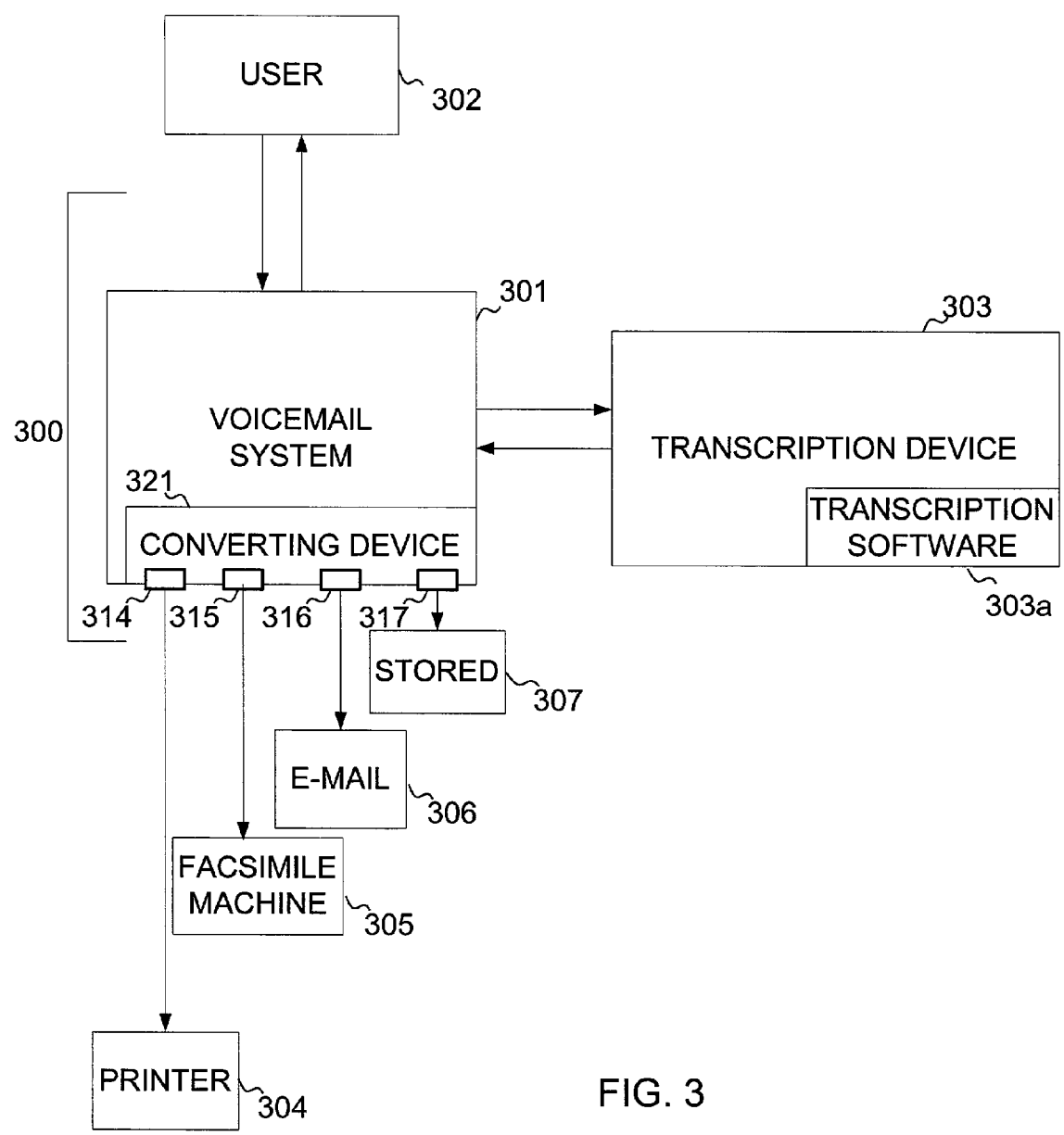
FIG. 3 illustrates a system according to an exemplary embodiment of the present invention wherein a recorded message may be transcribed and forwarded to one of several archival means.

A system 300 according to an exemplary embodiment of the present invention is shown in FIG. 3. The system 300, a storing device for recorded messages, may be part of a conventional voicemail system service provided by a phone company. Alternatively, the system 300 may be incorporated within a portable device that is sold separately, like an answering machine, and attachable to a phone system or answering machine. In yet another embodiment, the system 300 may be incorporated into a conventional telephone answering machine, and have outlet ports that are connectable to archival means, such as, for example, a printer, through suitable electrical connectors.

The system 300 is in communication with a conventional voicemail system 301, which is accessed by a user 302 to retrieve and hear any messages recorded therein. The user 302 may access the voicemail system 301 by telephone. Alternatively, if the voicemail system 301 is part of a portable stand-alone device, the user may access the system 301 by operating the device through standard operating means, such as, for example, through control buttons to play back designated messages.

If a phone company provides the voicemail system 301, the system 301 may be in communication with a transcription device 303, operating a transcription software 303a, that can receive a recorded message and transcribe it into a computer file, such as, for example, a text file. Commercially available transcription devices or transcription software, such as, for example, VIAVOICE by IBM, or other similar equipment or software, may be used. Once the transcription device 303 has completed transcribing the recorded message into a computer file, then the transcription device 303 returns the transcribed file back to the voicemail system 301. The voicemail system 301 forwards the transcribed message through one or more outlet ports 314, 315, 316, and 317 to pre-designated recipient archival means 304, 305, 306, and 307, respectively, that the user has indicated to receive the particular message when it is transcribed.

The voicemail system 301 may have to change the format of the transcribed message according to the archival means that has been designated to receive the message. A converting device, or converter means, 321 is used for changing the format of a computer file from one format into another format. For example, if the user has designated that the transcribed message be forwarded by email 306 to a particular email account, then the converting device 321 reformats the transcribed computer file received from the transcription device 303 and prepares it to be sent via email to a designated email address.

Similarly, the converter device 321 also can reformat the computer file received from the transcription device 303 to prepare the message to be sent to a designated facsimile 305 or to a designated printer 304 or to be stored 307 in a designated computer file memory. Alternatively, the voicemail system 301 can send a particular transcribed message to multiple archival means, thereby allowing multiple recipients to receive the transcribed message. When multiple different archival means are indicated by a user, the converter device 321 may have to reformat the computer file transcribed by the transcription device 303 such that each designated archival means receives a properly formatted transcribed file.

Figure 1:
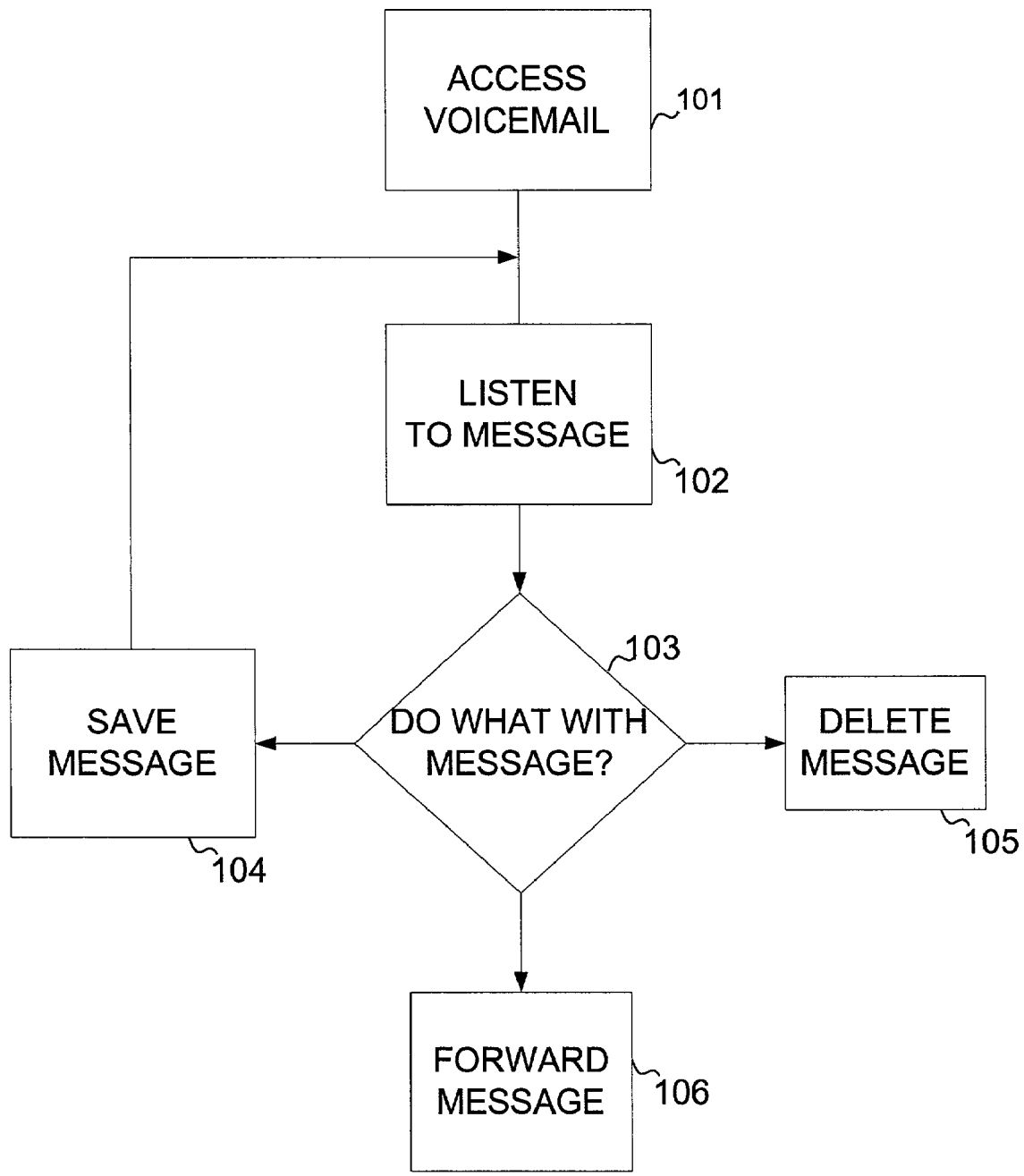
FIG. 1 illustrates a conventional voicemail message system wherein a recipient retrieves a voicemail message.

The transcription device 303 in FIG. 1 has been shown as separate from the voicemail system 301 for sake of simplicity. However, the transcription device 303 also may be incorporated within the voicemail system 301, such as when the system 300 is packaged as a unitary portable device. Furthermore, the transcription software 303a may be any conventional transcription software that can receive a recorded message and prepare a transcribed file of the message, which can then be forwarded to another device. An example of such transcription software is VIAVOICE by IBM, but other transcription software also may be used.

The foregoing disclosure of the preferred embodiments of the present invention has been presented for purposes of illustration and description. It is not intended to be exhaustive or to limit the invention to the precise forms disclosed. Many variations and modifications of the embodiments described herein will be appreciated by one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for transcribing a recorded message, the system comprising:
   an Internet site of a service provider that receives recipient-designated assignments of numeric options to archival devices;
   a memory storing the recipient-designated assignments of the numeric options;
   a storing device for storing a recorded message for a recipient of the recorded message, for playing back the recorded message to the recipient in response to the recipient attempting access to the recorded message, for prompting the recipient to select one of the numeric options as stored in memory for the recorded message after the recorded message has been played back and in response to the recipient attempting access to the recorded message, and for receiving a selection of one of the numeric options from the recipient to transcribe the recorded message in response to the prompt and provide it to the archival device corresponding to the chosen numeric option as stored in memory;

a transcription device, in communication with the storing device, for transcribing the recorded message into a computer file upon the storage device receiving the selection from the recipient to transcribe the recorded message;

plurality of archival devices, in communication with the transcription device, for reading the computer file and outputting or storing a transcribed version of the recorded message upon being chosen via the selection by the recipient of the numeric option; and a service provider network interconnecting the recipient to the storing device.

2. The system of claim 1, wherein the storing device is a voicemail message system.

3. The system of claim 1, wherein the storing device is a telephone answering machine.

4. The system of claim 1, wherein the transcription device is an integral part of the storing device.

5. The system of claim 1, wherein one of the archival devices is an email.

6. The system of claim 1, wherein one of the archival devices is a printer.

7. The system of claim 1, wherein one of the archival devices is a facsimile machine.

8. A system for transcribing a recorded message, the system comprising:

a voicemail message system for receiving input to create recipient-designated assignments of archival devices to numeric options, for storing a recorded message for a recipient of the recorded message after having created the recipient-designated assignments, for playing back the recorded message to the recipient in response to the recipient attempting access to the recorded message, for prompting the recipient to select numeric option for the recorded message after the recorded message has been played back and in response to the recipient attempting access to the recorded message, and for receiving a selection of one of the numeric options from the recipient to transcribe the recorded message in response to the prompt and send the transcribed message to the archival device corresponding to the selected numeric option;

a transcription device operating a transcription software and in communication with the storing device, for transcribing the recorded message into a computer file upon the storage device receiving the selection from the recipient to transcribe the recorded message; and a plurality of archival devices, in communication with the transcription device, for reading the computer file and outputting or storing a transcribed version of the recorded message upon being chosen via the selection by the recipient of the numeric option.

9. The system of claim 8, wherein the transcription device is an integral part of the voicemail message system.

10. A system for transcribing a recorded message, the system comprising:

a storing device for accessing recipient-designated assignments of numeric options to archival devices, for storing a recorded message for a recipient of the recorded message, for playing back the recorded message to the recipient in response to the recipient attempting access to the recorded message, for prompting the recipient to select at least one of the numeric options for the recorded message after the recorded message has been played back and in response to the recipient attempting access to the recorded message, and for receiving a selection of at least one of the numeric options from the recipient to transcribe the recorded message to at least one of multiple different formats in response to the prompt and to sending the transcribed message to a chosen archival device;

a transcription device, in communication with the storing device, for transcribing a recorded message into a text file upon the storage device receiving the selection from the recipient to transcribe the recorded message;

a converting device for converting the text file to at least one of the different formats that are recognized by different recording devices based on the selection from the recipient;

a plurality of archival devices having been assigned to the numeric options by the recipient designations, each archival device in communication with the converting device and capable of reading a recognized format of the text file and outputting or storing a transcribed version of the recorded message upon the numeric option assigned to the archival device being selected by the recipient; and a plurality of ports of the converting device for directly interfacing the converting device to each of the plurality of archival devices, each of the ports being associated with the assigned numeric options such that the converting device outputs the transcribed message via the port that is associated with the chosen numeric option.

11. The system of claim 10, wherein the storing device is a voicemail message system.

12. The system of claim 10, wherein the storing device is a telephone answering machine.

13. The system of claim 10, wherein the transcription device is an integral part of the storing device.

14. The system of claim 13, wherein the converting device is an integral part of the storing device.

15. The system of claim 10, wherein one of the archival devices is an email.

16. The system of claim 10, wherein one of the archival devices is a printer.

17. The system of claim 10, wherein one of the archival devices is a facsimile machine.

18. A system for transcribing a recorded message, the system comprising:

means for receiving assignments of numeric options to archival means from the recipient;

storing means for storing a recorded message for the recipient of the recorded message, for playing back the recorded message to the recipient in response to the recipient attempting access to the recorded message, for prompting the recipient to select a numeric option for the recorded message after the recorded message has been played back and in response to the recipient attempting access to the recorded message, and for receiving a selection of the numeric option from the recipient to transcribe the recorded message in response to the prompt;

transcribing means, in communication with the storing means, for transcribing the recorded message into a text file upon the storage device receiving the selection from the recipient to transcribe the recorded message;

a plurality of archival means, in communication with the transcribing means, for reading the text file and outputting or storing a transcribed version of the recorded message upon being chosen via the selection by the recipient of the numeric option; and a plurality of ports of the transcribing means for directly interfacing the transcribing means to each of the plurality of archival means, each of the ports being associated with the assigned numeric options such that the transcribing means outputs the transcribed message via the port that is associated with the chosen numeric option.

19. The system of claim 18, wherein the storing means comprises a voicemail message system.

20. The system of claim 18, wherein the storing means comprises a telephone answering machine.

21. The system of claim 18, wherein the transcribing means is an integral part of the storing means.

22. The system of claim 18, wherein one of the archival means comprises an email.

23. The system of claim 18, wherein one of the archival means comprises a printer.

24. The system of claim 18, wherein one of the archival means comprises a facsimile machine.

25. A portable message transcription system for transcribing a recorded message, the system comprising:
- a storing device for accessing recipient-designated assignments of numeric options to archival devices, for storing a recorded message for a recipient of the recorded message, for playing back the recorded message to the recipient in response to the recipient attempting access to the recorded message, for prompting the recipient to select a numeric option for the recorded message after the recorded message has been played back and in response to the recipient attempting access to the recorded message, and for receiving a selection of the numeric option from the recipient to transcribe the recorded message in response to the prompt and provide the transcribed message to the archival device corresponding to the chosen numeric option;
- a transcription device, in communication with the storing device, for transcribing the recorded message upon the storage device receiving the selection of the numeric option from the recipient to transcribe the recorded message;
- a converting device, in communication with the transcription device, for converting the transcribed message into a format that is readable by a plurality of archival devices; and
- a plurality of ports of the converting device, each in direct communication with one of the plurality of archival devices, for allowing output of the converted transcribed message to the archival device that has been chosen via the selection of the numeric option for output or storage thereon, each of the ports being associated with one of the assigned numeric options such that the converting device outputs the transcribed message via the port that is associated with the chosen numeric option.

26. The system of claim 25, wherein the transcription device is an integral part of the storing device.

27. The system of claim 25, wherein one of the archival devices is an email.

28. The system of claim 25, wherein one of the archival devices is a printer.

29. The system of claim 25, wherein one of the archival devices is a facsimile machine.

30. A method of transcribing a recorded message, the method comprising:
- assigning, by a recipient, a numeric option to each of a plurality of archival devices, each archival device being connected directly to a port of a converting device such that the assignment of the numeric option associates the numeric option to the port of the corresponding archival device;
- subsequently accessing, by the recipient over a service provider network, a storing device storing a recorded message for the recipient to thereby access the recorded message;
- listening, by the recipient, to the recorded message;
- in response to accessing and listening to the recorded message, responding, by the recipient, to a prompt for a numeric option by entering one of the numeric options assigned to one of the archival devices to indicate that the recorded message should be transcribed and then archived by the corresponding archival device; and
- outputting the transcribed message via the port that is associated with the entered numeric option to the archival device corresponding to the entered numeric option.

31. The method of claim 30, wherein the storing system comprises a voicemail message system.

32. The method of claim 30, wherein the storing system comprises a telephone answering machine.

33. The method of claim 30, wherein one of the archival devices is an email.

34. The method of claim 30, wherein one of the archival devices comprises a printer.

35. The method of claim 30, wherein one of the archival devices comprises a facsimile machine.

36. The method of claim 30, wherein one of the archival devices comprises a plurality of archival devices of different types.

37. A method of transcribing a recorded message on a voicemail message system, the method comprising:
- accessing, by a recipient, an Internet site of a service provider;
- assigning, by the recipient at the Internet site, a numeric option to each of a plurality of archival devices;
- accessing, by the recipient of the recorded message, the voicemail system to thereby access the recorded message;
- listening, by the recipient, to the recorded message; and
- in response to accessing and listening to the recorded message, responding, by the recipient, to a prompt for a numeric option for the recorded message by entering a numeric option corresponding to one of the archival devices to indicate that the recorded message should be transcribed.

38. The method of claim 37, wherein one of the archival devices comprises an email.

39. The method of claim 37, wherein one of the archival devices comprises a printer.

40. The method of claim 37, wherein one of the archival devices comprises a Facsimile machine.

41. The method of claim 37, wherein the archival devices are of different types.

* * * * *